US006843085B2

(12) United States Patent
Dimig

(10) Patent No.: US 6,843,085 B2
(45) Date of Patent: Jan. 18, 2005

(54) MODULAR VEHICLE DOOR LOCK AND LATCH SYSTEM AND METHOD

(75) Inventor: Steven J. Dimig, Plymouth, WI (US)

(73) Assignee: Strattec Security Corporation, Milwaukee, WI (US)

( * ) Notice: Subject to any disclaimer, the term of this patent is extended or adjusted under 35 U.S.C. 154(b) by 0 days.

(21) Appl. No.: 10/352,794

(22) Filed: Jan. 28, 2003

(65) Prior Publication Data

US 2003/0177796 A1 Sep. 25, 2003

Related U.S. Application Data

(63) Continuation of application No. 09/442,724, filed on Nov. 18, 1999, now Pat. No. 6,530,251.

(51) Int. Cl.[7] .................................................. B60R 25/02

(52) U.S. Cl. ........................ 70/237; 70/208; 292/336.3; 49/502

(58) Field of Search .......................... 70/237, 208, 263, 70/264, 275, 277; 49/502, 503; 292/201, 216, 336.3, 337, DIG. 23, 27; 296/146.1, 146.2, 146.5, 146.6, 146.9

(56) References Cited

U.S. PATENT DOCUMENTS

| | | | | | |
|---|---|---|---|---|---|
| 5,308,128 | A | | 5/1994 | Portelli et al. | |
| 5,328,219 | A | | 7/1994 | Konchan et al. | |
| 5,340,174 | A | * | 8/1994 | Bender et al. | 292/336.3 |
| 5,497,640 | A | | 3/1996 | Kokuryo | |
| 5,505,024 | A | * | 4/1996 | DeRees et al. | 49/503 |
| 5,558,372 | A | * | 9/1996 | Kapes et al. | 292/336.3 |
| 5,655,393 | A | * | 8/1997 | Kuo et al. | 70/107 |
| 5,666,834 | A | | 9/1997 | Inoue | |
| 5,676,002 | A | * | 10/1997 | Hoeptner, III | 70/416 |
| 5,706,554 | A | * | 1/1998 | Ruckert et al. | 292/336.3 |
| 5,794,994 | A | * | 8/1998 | Miyagawa et al. | 292/336.3 |
| 5,852,943 | A | | 12/1998 | Dutka et al. | |
| 5,876,074 | A | | 3/1999 | Dowling | |
| 5,895,081 | A | | 4/1999 | Tanimoto et al. | |
| 5,902,004 | A | * | 5/1999 | Waltz et al. | 296/146.9 |
| 5,904,002 | A | * | 5/1999 | Emerling et al. | 49/502 |
| 5,927,772 | A | | 7/1999 | Antonucci et al. | |
| 5,987,942 | A | * | 11/1999 | Ichinose | 70/208 |
| 5,996,381 | A | | 12/1999 | Yoneyama | |
| 6,050,117 | A | | 4/2000 | Weyerstall | |
| 6,062,615 | A | | 5/2000 | Hunt et al. | |
| 6,073,397 | A | * | 6/2000 | Tanimoto et al. | 49/460 |
| 6,079,757 | A | | 6/2000 | Aubry | |
| 6,102,453 | A | | 8/2000 | Cetnar | |
| 6,109,674 | A | * | 8/2000 | Bartel et al. | 292/337 |
| 6,141,914 | A | * | 11/2000 | Feige et al. | 49/503 |

(List continued on next page.)

FOREIGN PATENT DOCUMENTS

| | | | |
|---|---|---|---|
| CA | 1 332 620 A | | 10/1994 |
| EP | 169644 | | 6/1985 |
| EP | 0 400 505 A1 | | 12/1990 |
| EP | 400505 | * | 12/1990 |
| EP | 508580 | * | 3/1991 |
| EP | 0 508 580 A1 | | 10/1992 |
| WO | WO98/49417 A | | 11/1998 |

*Primary Examiner*—Suzanne Dino Barrett
(74) *Attorney, Agent, or Firm*—Michael Best & Friedrich LLP

(57) ABSTRACT

A locking and latching system of modular construction in which some of the components of the system are pre-assembled prior to their installation into the structural framework of a vehicle door. The modular construction of the lock and latch system can include the outside and inside door handles, the outside and inside locks, the door latch itself, as well as linkages between these components. The modular components can further facilitate the assembly process by being of a design which simplifies the process of installing them into the structural framework of a vehicle door without requiring the use of specialized tools, thereby reducing the labor costs associated with assembly.

16 Claims, 12 Drawing Sheets

U.S. PATENT DOCUMENTS

| | | | | | |
|---|---|---|---|---|---|
| 6,142,540 | A | | 11/2000 | Girard et al. | |
| 6,189,267 | B1 | * | 2/2001 | Staser | 49/503 |
| 6,192,725 | B1 | * | 2/2001 | Watson et al. | 70/208 |
| 6,240,754 | B1 | * | 6/2001 | Petersen | 70/417 |
| 6,241,294 | B1 | * | 6/2001 | Young et al. | 292/336.3 |
| 6,254,148 | B1 | | 7/2001 | Cetnar | |
| 6,264,254 | B1 | | 7/2001 | Siegfried et al. | |
| 6,264,257 | B1 | * | 7/2001 | Meinke | 292/336.3 |
| 6,343,494 | B2 | * | 2/2002 | Roos et al. | 70/264 |
| 6,393,767 | B1 | * | 5/2002 | Fukumoto et al. | 49/503 |
| 6,530,251 | B1 | * | 3/2003 | Dimig | 70/237 |
| 6,550,295 | B2 | * | 4/2003 | Hubner | 70/208 |
| 6,571,516 | B2 | * | 6/2003 | Nakamoto et al. | 49/503 |
| 2001/0022051 | A1 | * | 9/2001 | Fukumoto et al. | 49/503 |
| 2001/0037608 | A1 | * | 11/2001 | Spurr et al. | 49/503 |
| 2002/0005015 | A1 | * | 1/2002 | Spurr | 49/502 |

* cited by examiner

FIG. 4
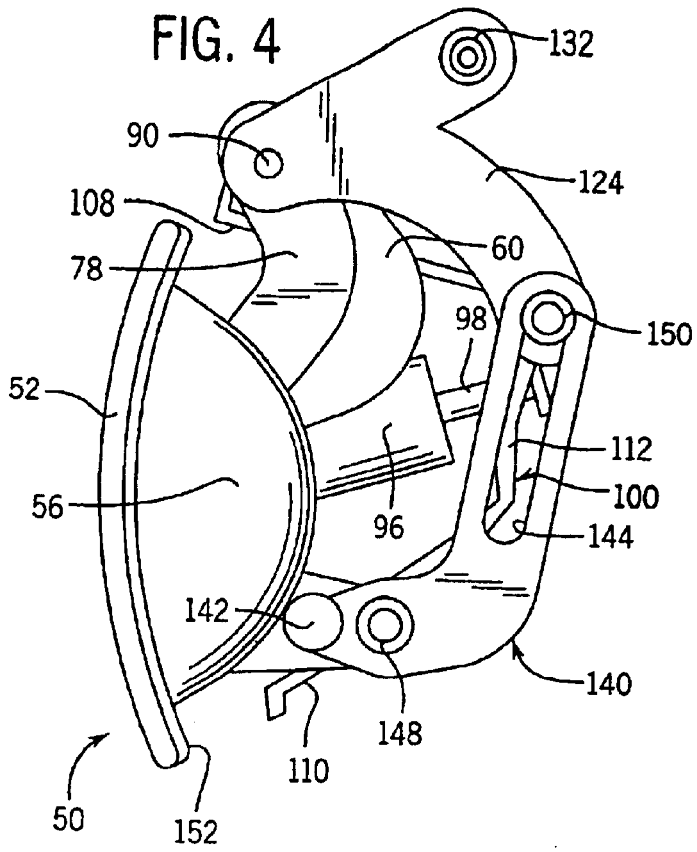
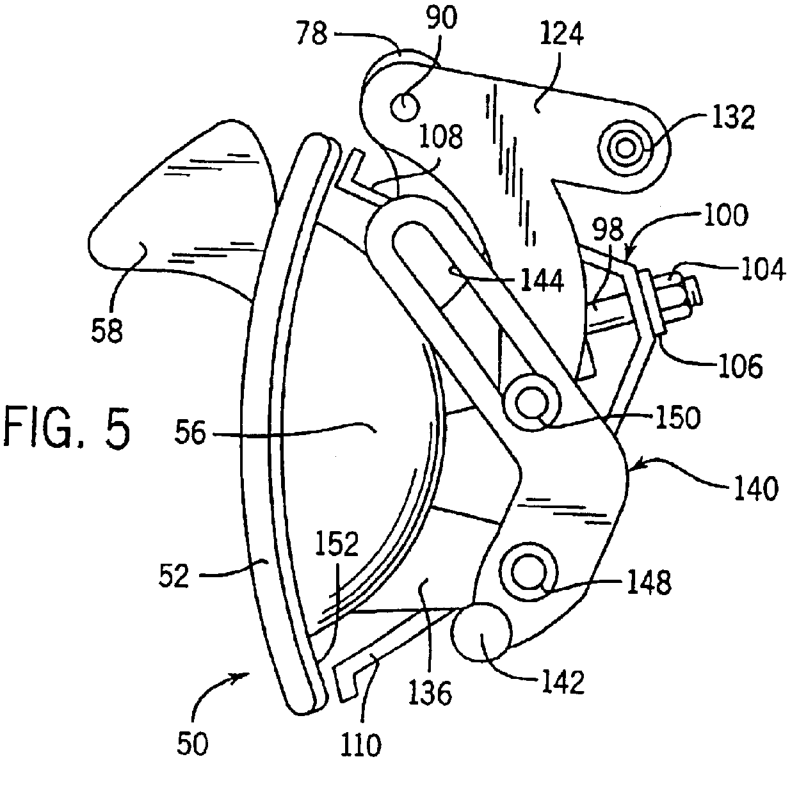
FIG. 5

FIG. 6
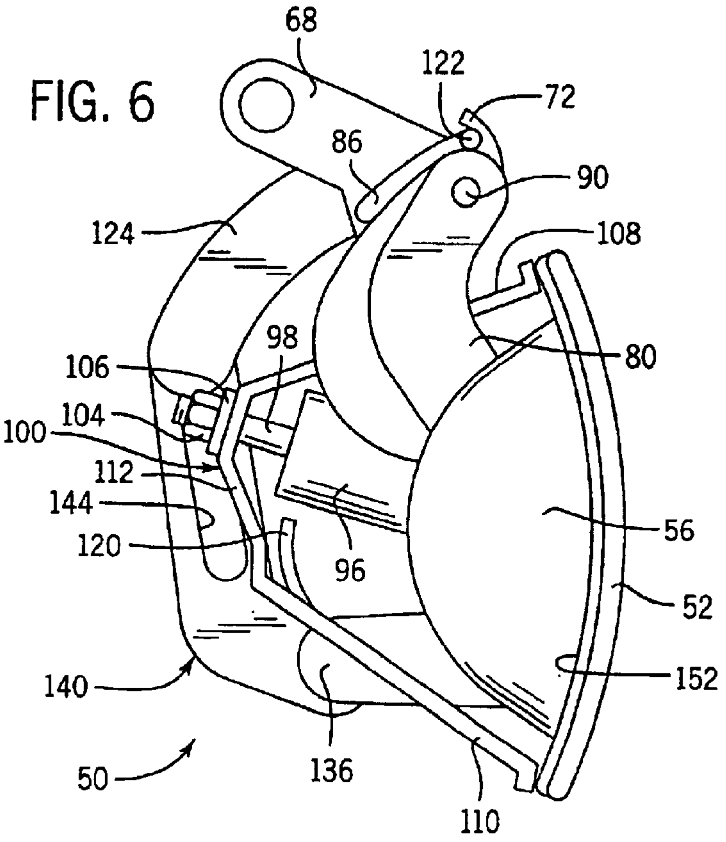
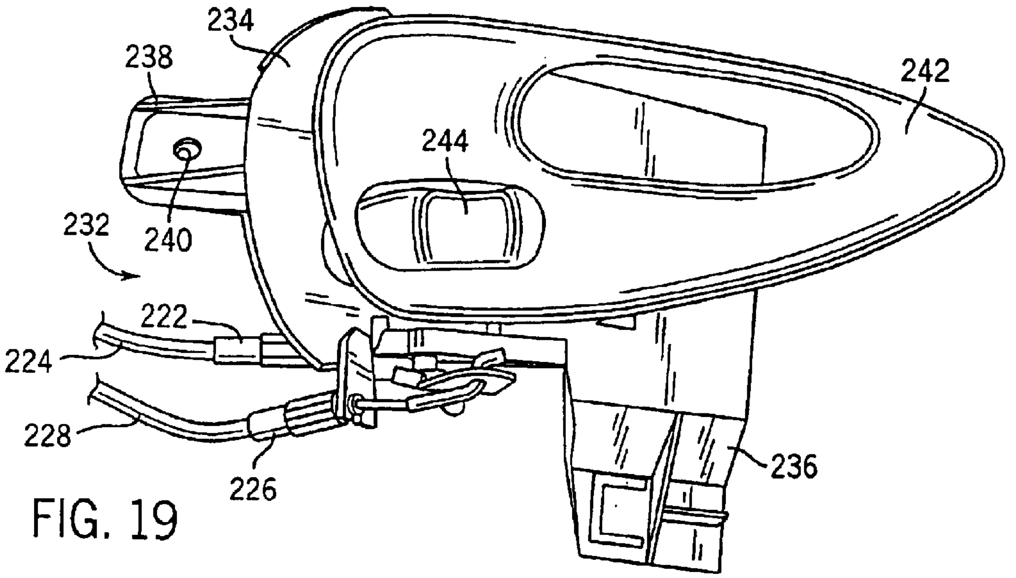
FIG. 19

FIG. 7
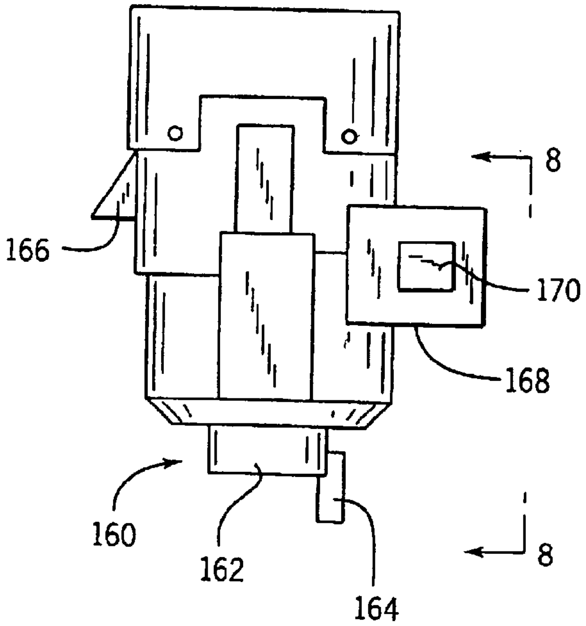
FIG. 8
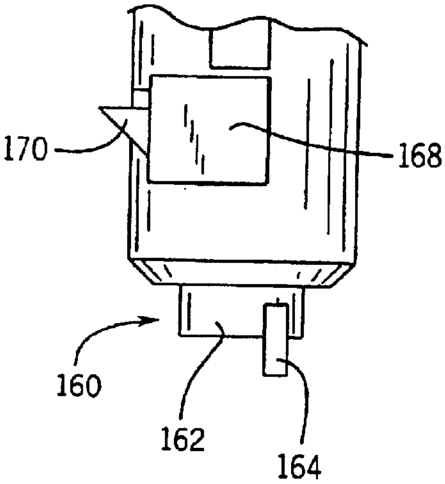
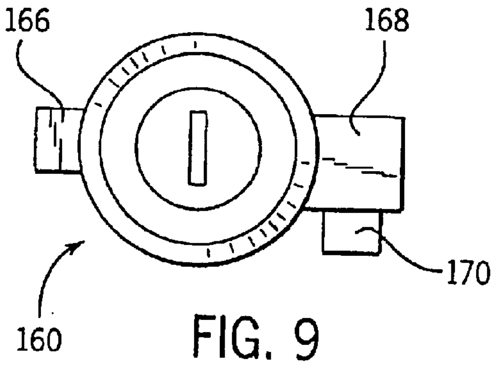
FIG. 9
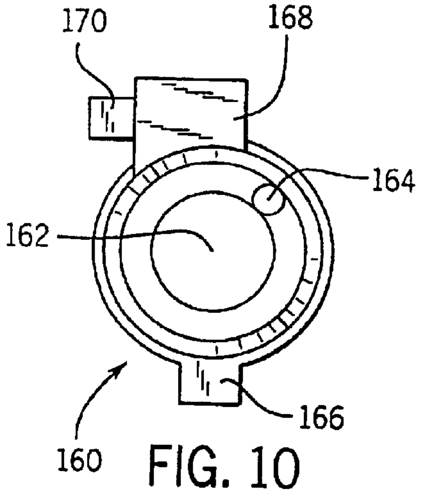
FIG. 10

FIG. 17
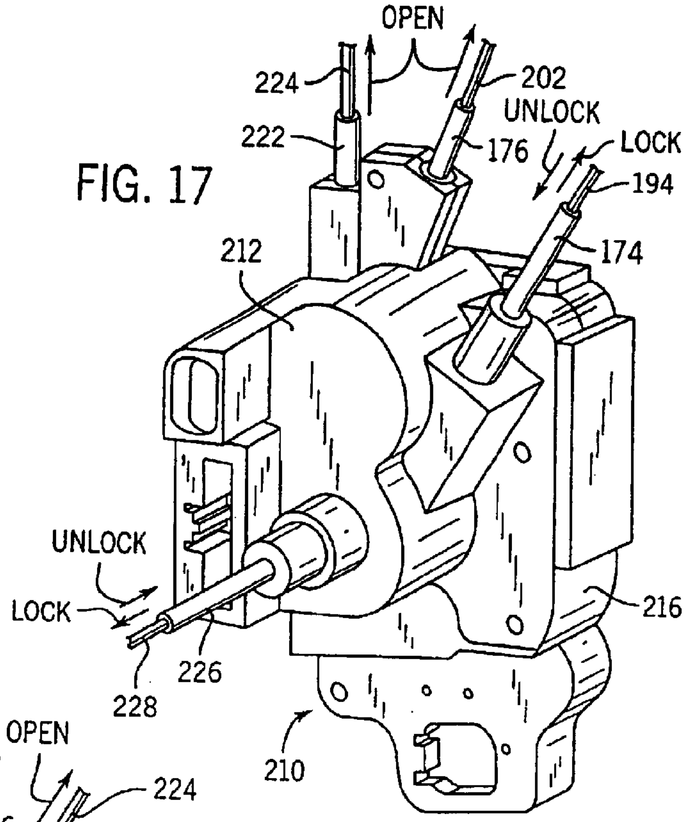
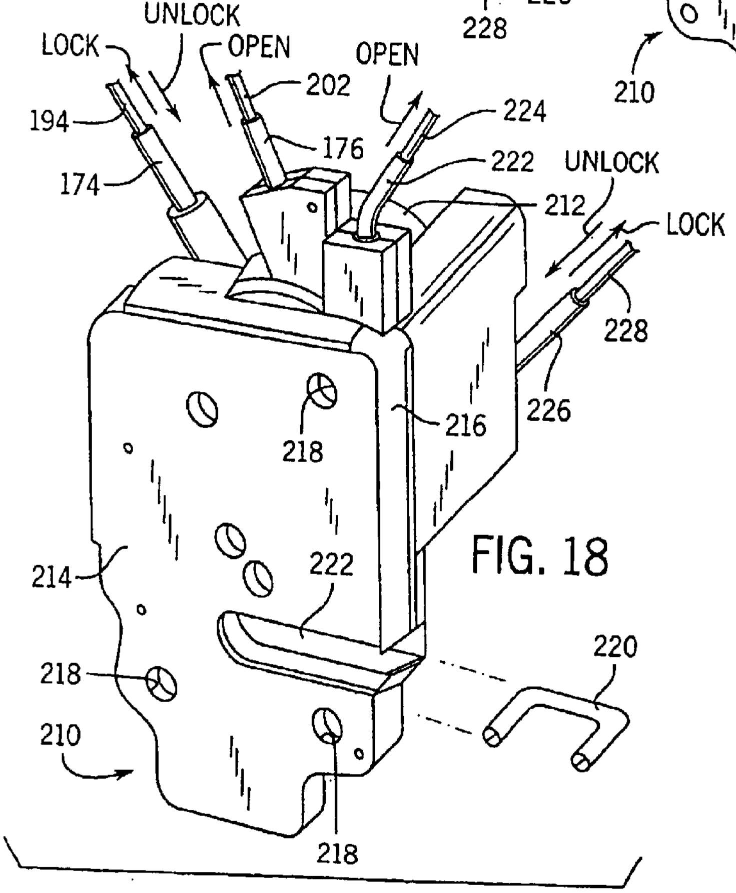
FIG. 18

MODULAR VEHICLE DOOR LOCK AND LATCH SYSTEM AND METHOD

CROSS-REFERENCE TO RELATED APPLICATIONS

This is a continuation of U.S. application Ser. No. 09/442,724, filed Nov. 18, 1999, and now U.S. Pat. No. 6,530,251 the entire contents of which are herein incorporated by reference.

BACKGROUND OF THE INVENTION

The present invention relates generally to a vehicle door locking and latching apparatus, and more particularly to an improved modular vehicle door lock and latch system. Locking and latching systems typically have one or more limitations relating to installation difficulty, speed, and/or cost. In light of these and other limitations of conventional locking and latching systems, new locking and latching systems would be welcome in the art.

SUMMARY OF THE INVENTION

Some embodiments of the present invention provide a locking and latching system of modular construction such that at least two of the components of the system are pre-assembled prior to their installation into the structural framework of a vehicle door. In some embodiments, the lock and latch system includes modular components including various user-manipulatable controls (e.g., outside and inside door handles and outside and inside locks), the door latch itself, as well as all linkages between these components. Modular components can facilitate the assembly process by simplifying the process of installing them into the structural framework of a vehicle door, and by not requiring the use of specialized tools, thereby further reducing the labor costs associated with assembly. In some cases, the present invention can substantially enhance the security of a vehicle by providing a lock and latch system which has an enhanced level of resistance to manipulation by jimmying with a “slim jim” or similar tool of the type commonly used by car thieves.

In some embodiments of the present invention, a lock and latch system is manufactured in three modular assemblies, the first of which includes an inside door handle, an inside lock, a door latch, and an outside door lock and door handle interface member, as well as linkages between these components. The second component in such embodiments can be an outside door lock which is easily installed in the outside door lock and door handle interface member. The third component in such embodiments can be an outside door handle assembly which will be operatively connected to the outside door lock and door handle interface member.

In some alternate embodiments, the inside door handle and the inside lock together comprise a fourth component which is not necessarily initially connected to the rest of the first component (the door latch, the outside door lock and door handle interface member, and the linkages between components). In such embodiments, the first component can, however, include the linkage members which will be connected to the mechanism of the inside door handle of the inside door lock. While the rest of the first component is installed in the structural framework of the vehicle door, these linkage members can extend out of the vehicle door to allow them to be connected to the inside door handle in the inside door lock. Thus, in such embodiments, following the connection of the first and fourth components together, the inside door handle in the inside door lock can be installed into the structural framework of the vehicle door.

The outside door handle according to some embodiments can be installed in the manner described in U.S. Pat. No. 5,706,554, to Rükert et al. (i.e., by placing the outside door handle assembly into position in an opening in the outer skin of the structural framework of the vehicle door and moving the handle from its non-actuated position to its actuated position). U.S. Pat. No. 5,706,554 is hereby incorporated herein by reference insofar as it relates to the connection of door handle assemblies to doors via actuation of door handles. Alternately, a conventional design door handle (e.g., a paddle type or a pull strap type) could be used instead of the type of door handle taught by the ’554 patent. Either of these types of door handles can be mounted and pivot with respect to any desired structure, such as an outside door handle housing member (which can, for example, be part of the second component described above), a portion of the vehicle door (e.g., the sheet metal of the outer skin and/or the structural framework of the vehicle door), or an outside door lock and door handle interface member.

When employed, the outside door lock and door handle interface member can be installed in or adjacent to the opening in the outer skin of the structural framework of a vehicle door. In some embodiments, the outside door lock and door handle interface member installs into the opening without using tools. Also, in some cases the outside door lock and door handle interface member is retained in position by the outside door handle assembly when the outside door handle assembly is installed into the opening.

The housing of the outside door lock and door handle interface member can be made of a die-cast zinc element which interlocks with the sheet metal of the outer skin of the structural framework of the vehicle door. It will be appreciated by those skilled in the art that such a mounting arrangement can result in an enhanced level of security for the lock and latch system of the present invention, since the all-metal design can make it substantially more difficult for a thief to pop the door lock out and thereby open the vehicle door.

In some embodiments, the outside door lock and door handle interface member is connected to two cables, although other types of linkages well known to those skilled in the art or a combination of such linkage elements and cables can also be used. For example, one cable can be used together with another type of mechanical linkage such as a pin. In such an arrangement, the cable can be used to connect the outside door handle to the latch while the pin can be used to connect the outside lock to the door latch. It will be appreciated by those skilled in the art that the use of cables can substantially enhance the level of security afforded by the lock and latch system of the present invention, since such cables are resistant to jimmying by a thief using a “slim jim.”

In those embodiments employing an outside door lock, the outside door lock can be installed into the outside door lock and door handle interface member, and can be accessible through the outside door handle assembly when these components are installed into the opening in the outer skin of the structural framework of the vehicle door. In some cases where cables extend from the outside door lock and door handle interface member, one of the cables in the outside door lock and door handle interface member can be driven by an outside door lock cable actuator which can be driven by the outside door lock. The outside door handle assembly can include a mechanical linkage which connects the outside door handle to an outside door handle cable actuator in the outside door lock and door handle interface member when the outside door handle assembly is installed. If desired, another cable in the outside door lock and door handle interface member can be driven by the outside door handle cable actuator, which can be driven by the linkage in the outside handle assembly.

In some embodiments, an inside door handle and an inside door lock actuator are both contained in a single assembly. Also, in some embodiments the inside door handle and inside door lock assembly are connected by two cables. One of the cables can be driven by the inside door handle, and the other cable can be driven by the inside door lock cable actuator. Those skilled in the art will readily appreciate that other types of linkages or a combination of such linkage elements and cables could instead be used.

If desired, cables can be employed to transfer mechanical force to the door latch. By way of example only, four cables can extend to the door latch from the outside door lock and door handle interface member and the inside door handle and inside door lock assembly. In some embodiments, the door latch used is the device described in U.S. patent application Ser. No. 09/408,993, entitled "Electronic Latch Apparatus and Method," issued to Dimig and filed on Sep. 29, 1999, which is a continuation-in-part of U.S. patent application Ser. No. 09/263,415 issued to Dimig and filed on Mar. 5, 1999. U.S. patent application Ser. No. 09/408,993 and U.S. patent application Ser. No. 09/263,415, in their entirety, are hereby incorporated herein by reference.

In some embodiments, an electronic door latch is actuated by two cables: one cable extending from the inside door handle and operating a first control element in the electronic door latch, and another cable extending from the outside door handle and operating a second control element in the electronic door latch. A solenoid-actuated pin can be used to lock the electronic door latch, preventing it from being opened from the outside handle if the solenoid has retracted a pin from the second control element.

Although any lock and latch system can be employed in the present invention, in some embodiments the lock and latch system of the present invention uses the second embodiment of the electronic door latch illustrated in FIGS. 17–31 of the U.S. patent application Ser. No. 09/408,993 discussed above. In such cases, two cables can be respectively operatively connected to a solenoid armature such that movements of either of the cables can also be used to extend or retract the pin from the solenoid. Accordingly, the cables from either an inside door lock cable actuator or an outside door lock cable actuator can be operatively connected to the solenoid such that either of them can extend or retract the pin from the second control element. In some embodiments, two solenoids could instead be used, each corresponding to a respective control element. In such cases, cables operating the inside and outside locks can be connected to drive two pins, one of which is associated with each of the solenoids.

As mentioned above, in some embodiments the lock and latch system of the present invention is assembled into three modules which are delivered to the motor vehicle manufacturer. The first module can include the outside door lock and door handle interface member, the inside door handle and inside door lock assembly, the electronic door latch, and cables (e.g., four cables in some of the exemplary embodiments described above) connecting the first three components. This first module can be pre-assembled in its entirety, if desired. The second module can include the outside door lock, which can be part of a set of identically-keyed locks for installation into the doors, the ignition switch, and the trunk of the vehicle. The third module can include the outside door handle assembly (e.g., as assembly which includes the outside door handle itself, and in some cases the mechanical linkage which can be used to connect it to a handle cable actuator in the outside door lock and door handle interface member). The third module can also include the outside handle mounting mechanism which secures the outside door handle assembly in place when the outside door handle is actuated for the first time. In some embodiments, part of this third module is also located outside and partially overlying the lock cylinder, with the lock cylinder being accessible through this third module.

Some embodiments of the present invention provide a mounting bracket used to support an outside door lock and door handle interface member in a spaced relationship with respect to an electronic door latch. This mounting bracket can be both small and flexible, and can further facilitate installation of the components supported therefrom into the structural framework of a vehicle door. In some cases, the mounting bracket also extends between the inside door handle and inside door lock assembly and the electronic door latch in order to establish a spaced relationship therebetween.

In some embodiments, the lock and latch system includes the outside door handle as a separate modular component, thereby allowing outside door handles to be manufactured in a variety of colors to match exterior vehicle paint colors while allowing other modular components of the system to be of a single type and color. When employed according to the present invention, the pre-assembled nature of the modular components can reduce or eliminate the requirement for adjustments to be made during the assembly of the components of the lock and latch system into the structural framework of a vehicle door, thereby further minimizing assembly costs while simultaneously enhancing vehicle quality. The modular components can be adaptable for use on a variety of different vehicles by merely switching outside door handles and providing different size linkages between the various modular components.

The lock and latch system of the present invention can also be of a construction which is both durable and long lasting so that it requires little or no maintenance to be provided by the user throughout its operating lifetime. In order to enhance the market appeal of the lock and latch system of the present invention, it can also be of inexpensive construction to thereby afford it the broadest possible market.

Other features and advantages of the invention will become apparent to those skilled in the art upon review of the following detailed description, claims, and drawings.

BRIEF DESCRIPTION OF THE DRAWINGS

FIG. 4 is a side view of the outside handle assembly illustrated in FIG. 3 from a first side and with the door handle in its normally retracted position, showing the linkage used to move the ball connector when the door handle is opened, and also showing a retention mechanism in a preinstalled position;

FIG. 5 is a side view of the outside handle assembly similar to the view illustrated in FIG. 4 but with the door handle in its extended position, showing the movement of the linkage and the ball connector, and also showing the retention mechanism in its installed position;

FIG. 6 is a side view of the outside handle illustrated in FIGS. 3 through 5 from a second side and with the door handle in its retracted position following movement of the retention mechanism to its installed position;

FIG. 7 is a plan view of an outside lock assembly from a first side, showing a pin extending from the rear end thereof;

FIG. 8 is a plan view of a portion of the outside lock assembly illustrated in FIG. 7 from a second side, showing the spring-loaded retention mechanism used to retain the outside lock assembly in place;

FIG. 9 is a plan view of the outside lock assembly illustrated in FIGS. 7 and 8 from the front end thereof;

FIG. 10 is a plan view of the outside lock assembly illustrated in FIGS. 7 through 9 from the rear end thereof;

FIG. 17 is a perspective view of a door latch assembly from the front side, showing portions of four cables connected to the door latch assembly;

FIG. 18 is a rear perspective view of the door latch assembly of FIG. 16, showing how a striker mounted on the vehicle body is engaged and retained by a ratchet in the door latch assembly;

FIG. 19 is a plan view of an inside door handle and inside door lock assembly, showing portions of two cables connected to the assembly;

Figure 1:
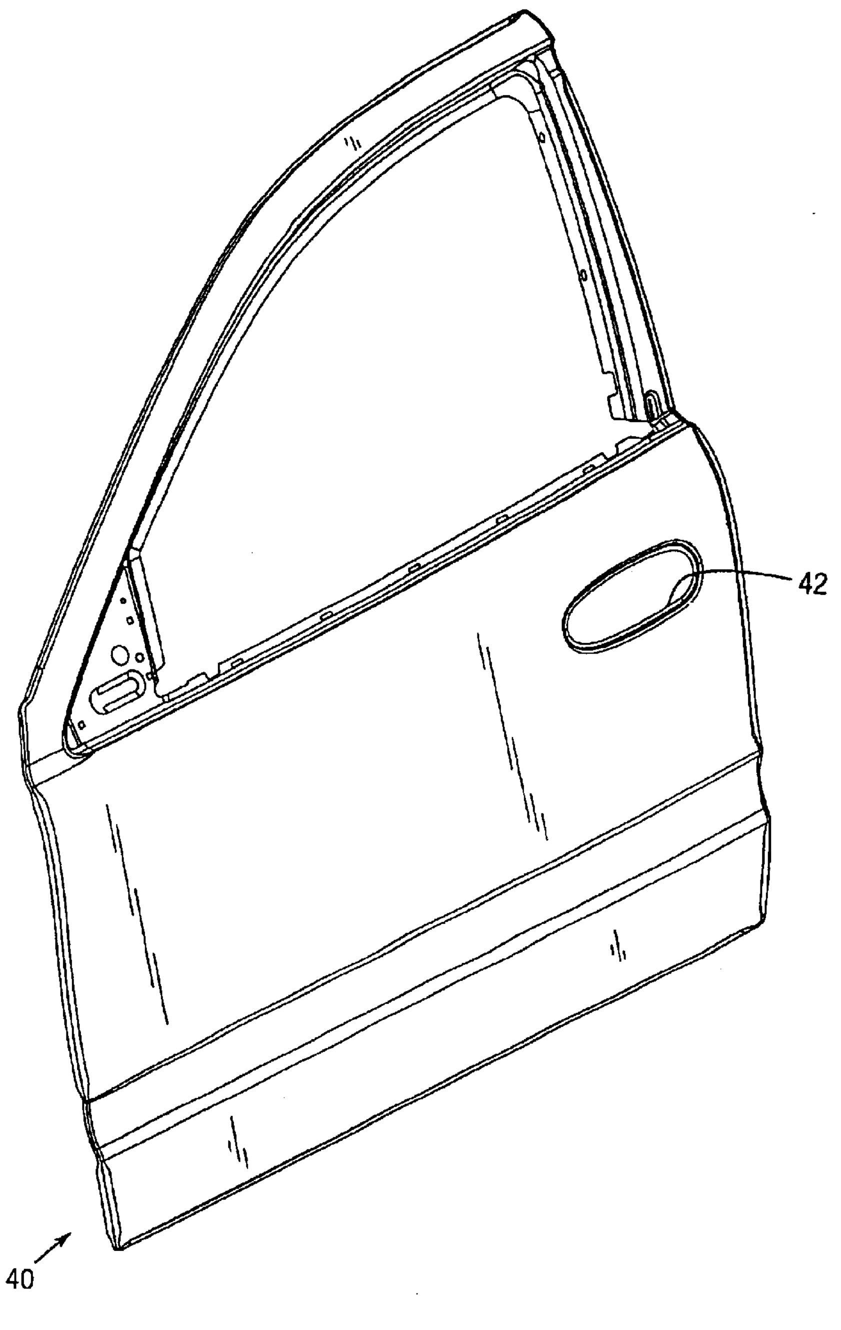
FIG. 1 is a perspective view of the structural framework of a vehicle door from the outside, showing an opening in which the outside handle and outside lock will be mounted.

Before embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter.

DETAILED DESCRIPTION OF THE PREFERRED EMBODIMENT

A first illustrated embodiment of an exemplary lock and latch system according to the present invention consists of three modules which are pre-assembled prior to delivery to the manufacturer (i.e., a party assembling the motor vehicles into which the lock and latch system will be incorporated). In the first illustrated embodiment, the first module consists of three primary components, namely an outside door lock and door handle interface member, an inside door handle and inside door lock assembly, and an electronic door latch, with four cables being used to connect these three components. These three components will be discussed separately, prior to a discussion about their incorporation into a single module. The second module is the outside lock, which in the exemplary first illustrated embodiment is a cylinder-type lock. The third module is the outside door handle assembly, which will also be discussed separately.

Figure 2:
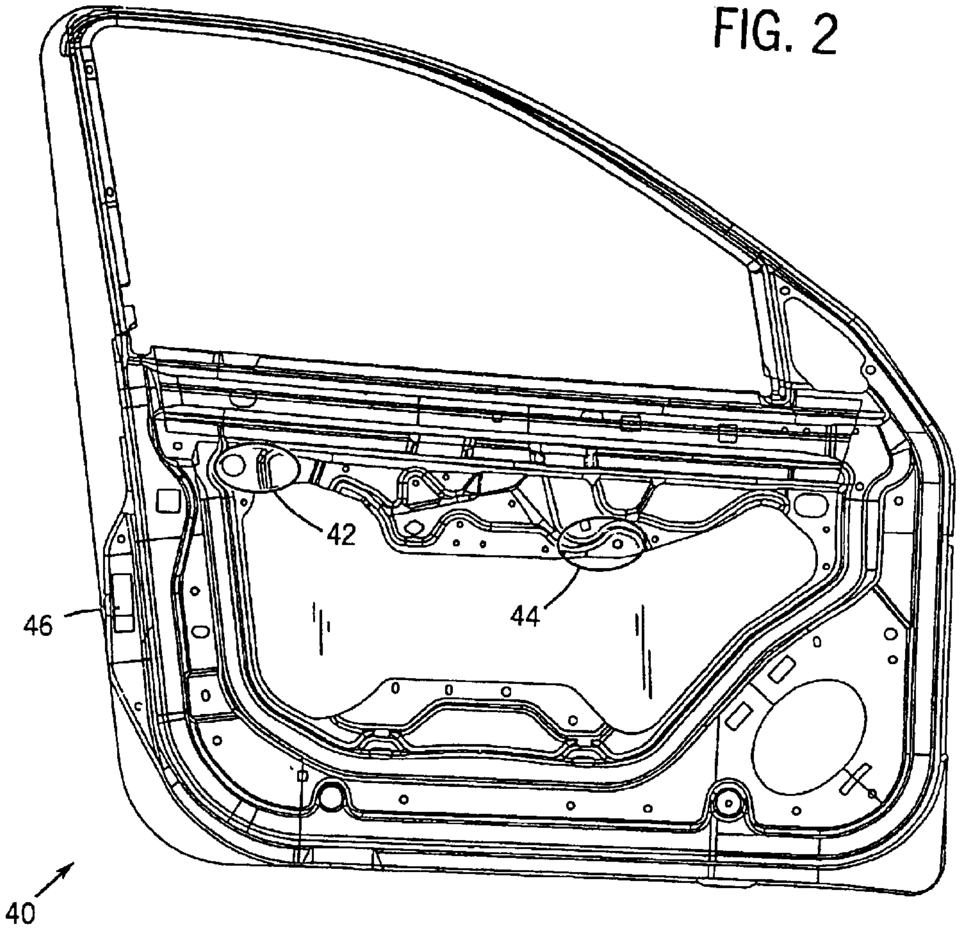
FIG. 2 is an elevational view of the structural framework of the vehicle door illustrated in FIG. 1 from the inside, with the locations at which the door latch, the outside handle and outside lock, and the inside handle and inside lock will be mounted highlighted.
Figure 3:
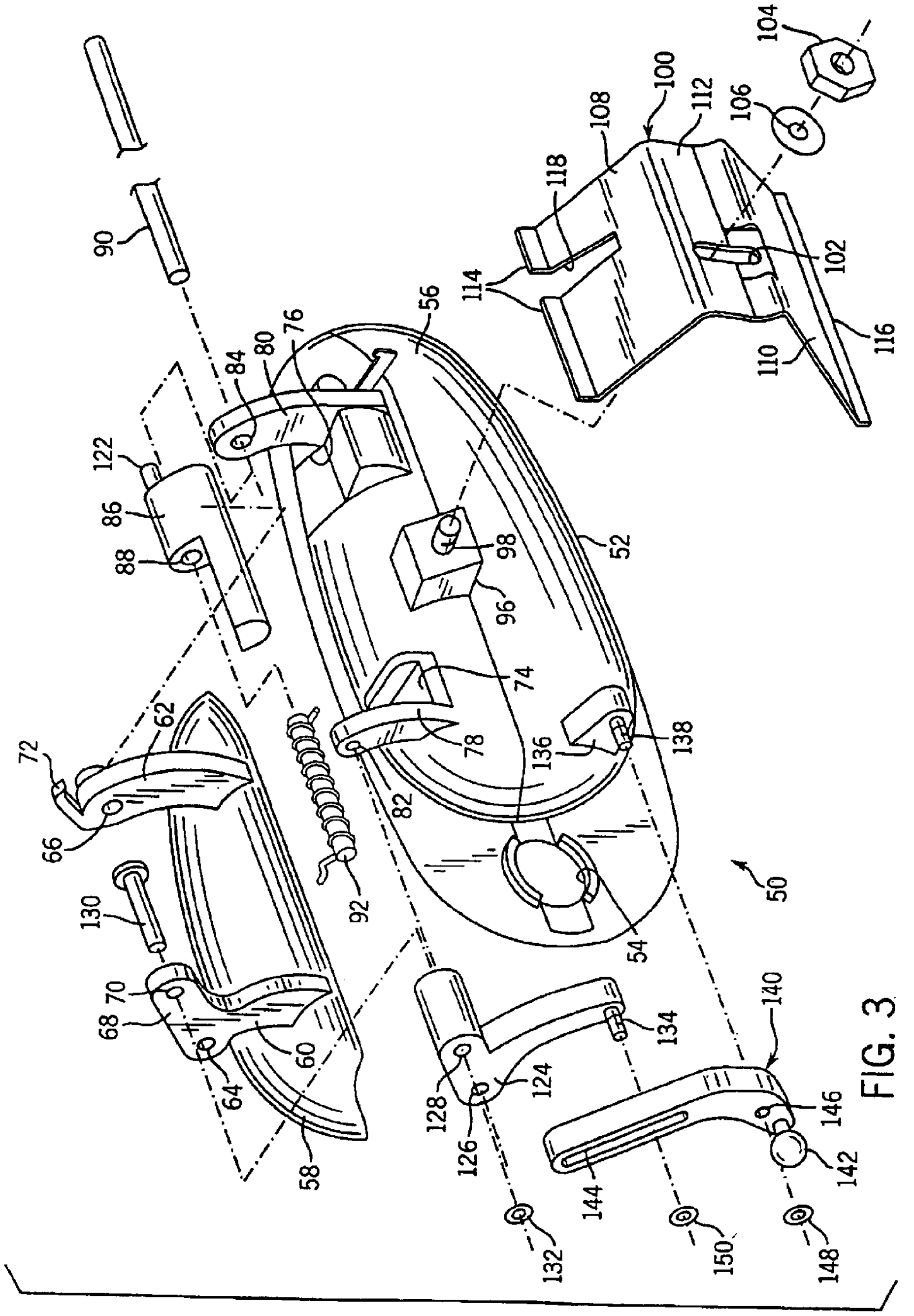
FIG. 3 is an exploded view of an outside handle assembly constructed according to the teachings of the present invention, showing an aperture and a ball connector at the location at which an outside door lock and door handle interface member will be mounted.
Figure 11:
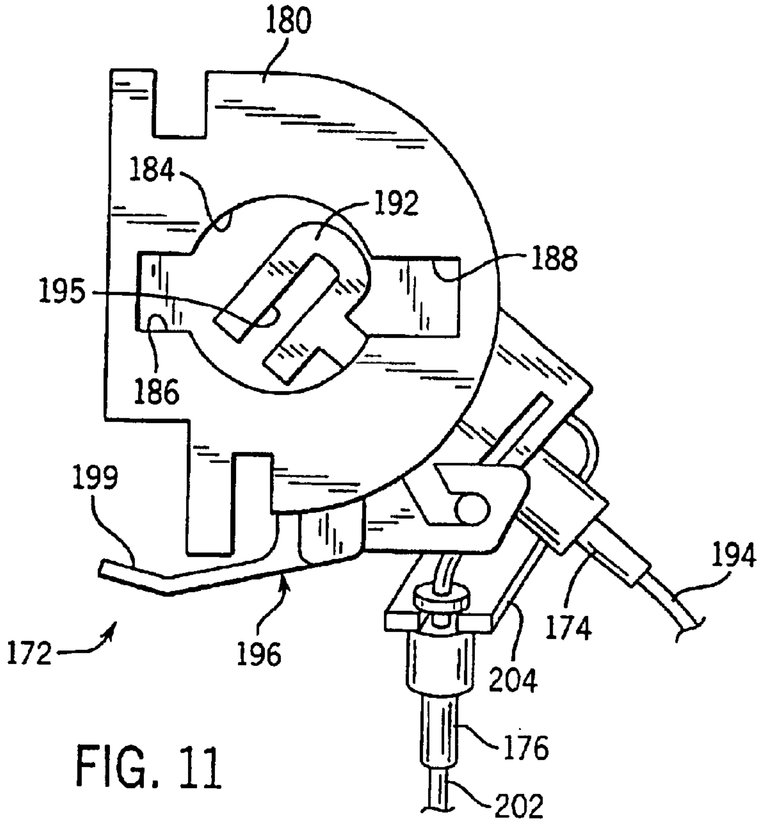
FIG. 11 is a front plan view of an outside door lock and door handle interface member from the front side thereof, showing portions of two cables connected to the assembly, the interface member having a recess therein for receiving the outside lock assembly illustrated in FIGS. 7 through 10, the recess having an outside door lock cable actuator attached to one of the cables contained therein, and also showing a pivotable outside door handle cable actuator attached to the other of the cables at one end thereof and having a U-shaped fork at the other end thereof.

Referring first to FIGS. 1 and 2, the structural framework of a vehicle door 40 is illustrated from the outside in FIG. 1 and from the inside in FIG. 2. The structural framework of the vehicle door 40 has an opening 42 in the outer skin of the structural framework of the vehicle door 40 (best illustrated in FIG. 1, illustrated schematically in FIG. 2) into which an outer handle assembly and an outside door lock (neither of which are illustrated in FIGS. 1 and 2) will be mounted. The structural framework of the vehicle door 40 also has the location for an inside door handle and inside door lock assembly (not illustrated in FIG. 1 or 2) indicated by the reference numeral 44 in FIG. 2 and the location for a door latch (not illustrated in FIG. 1 or 2) indicated by the reference numeral 46 in FIG. 2.

Referring next to FIGS. 3 through 6, the construction of an exemplary outside door handle assembly 50 according to the present invention is illustrated. In this embodiment, all of the various components of the outside door handle assembly 50 are assembled onto an outside door handle housing member 52, which is of a size and configuration to fit partially into the opening 42 in the outer skin of the structural framework of the vehicle door 40 (shown in FIG. 1). The outer periphery of the outside door handle housing member 52 is larger than the opening 42 in the outer skin of the structural framework of the vehicle door 40.

Located near one side of the outside door handle housing member 52 is an aperture 54 which will receive the proximal end (the end next to or nearest the point of attachment or origin) of an outside door lock (not illustrated in FIGS. 3 through 6). Located intermediate the aperture 54 and the other end of the outside door handle housing member 52 is a concave portion 56 which will receive a user-manipulatable control (e.g., an outside door handle 58) therein in a flush manner when the outside door handle 58 is not actuated.

The outside door handle 58 in the illustrated embodiment of FIGS. 3–6 has two support arms 60 and 62 located near opposite ends thereof. The support arm 60 has an aperture 64 located near the end thereof remote from the point of attachment of the support arm 60 to the outside door handle 58. The support arm 62 has an aperture 66 located near the end thereof remote from the point of attachment of the support arm 62 to the outside door handle 58.

The support arm 60 has an extension 68 projecting in the same plane as the support arm 60 from the end thereof remote from the point of attachment of the support arm 60 to the outside door handle 58. The distal end (the end situated away from the point of attachment or origin) of the extension 68 has an aperture 70 located therein. The support arm 62 has a projection 72 extending from the side thereof near the end thereof remote from the point of attachment of the support arm 62 to the outside door handle 58.

The outside door handle housing member 52 has two openings 74 and 76 located near opposite ends of the concave portion 56 to admit the support arms 60 and 62, respectively, therethrough. Extending from the outside door handle housing member 52 on the back side of the concave portion 56 immediately outside the openings 74 and 76 are two handle mounting arms 78 and 80. The handle mounting arms 78 and 80 have apertures 82 and 84, respectively, located near their ends which are remote from their point of attachment to the outside door handle housing member 52.

The mechanism used to mount the outside door handle assembly 50 can be similar to the apparatus disclosed in U.S. Pat. No. 5,706,554, which is incorporated herein by reference. In the exemplary embodiment of the outside door handle assembly 50 illustrated in FIGS. 3–6, a cam member 86 having an aperture 88 extending therethrough is mounted adjacent the handle mounting arm 80 using a pin 90. Also mounted on the pin 90 is a spring 92, which bears against the support arm 60 of the outside door handle 58 and the inside surface of the outside door handle housing member 52, and operates to keep the outside door handle 58 in its flush position with respect to the outside door handle housing member 52.

The pin 90 extends sequentially through the aperture 84 in the handle mounting arm 80, the aperture 66 in the support arm 62 of the outside door handle 58, the aperture 88 in the cam member 86, the spring 92, the aperture 64 in the support arm 60, and the aperture 82 in the handle mounting arm 78. In the first illustrated embodiment, the pin 90 has an interference fit with one or both of the apertures 82 and 84 in the handle mounting arms 78 and 80, respectively, although other ways of retaining the pin 90 in place will be readily apparent to those skilled in the art.

Extending from the back side of the concave portion 56 of the outside door handle housing member 52 is an essentially square lock support post 96, which is located between and slightly below the level of the handle mounting arms 78 and 80. Extending from the distal end of the lock support post 96 is a threaded post 98. Mounted on the threaded post 98 is a lock plate 100 which has a vertical slot 102 therein through which the threaded post 98 extends. A nut 104 and a washer 106 are used to retain the lock plate 100 in place on the threaded post 98, although, as can best be seen in FIGS. 5 and 6, the nut 104 is not fully tightened on the threaded post 98. Other manners of retaining the lock plate 100 in place on the threaded post 98 which will be readily apparent to those skilled in the art may alternatively be used.

The exemplary lock plate 100 of the illustrated embodiment in FIGS. 3–6 can be seen as having three primary portions (i.e., two planar portions 108 and 110 both connected to an irregular central portion 112). The vertical slot 102 in this embodiment is located in the irregular central portion 112. The two planar portions 108 and 110 are at an angle of approximately 60 degrees with respect to each other, and each have a small outwardly extending flange 114 and 116 located at its respective distal edge. A slot 118 is located in the distal edge of the planar portion 108 to admit the end of the spring 92 which bears on the outside door handle housing member 52.

Note that when the lock plate 100 is in the position illustrated in FIG. 4 (the installation position), the flange 114 on the planar portion 108 of the lock plate 100 is spaced slightly away from the top edge of the outside door handle housing member 52, and the flange 116 on the planar portion 110 of the lock plate 100 is spaced well away from the bottom edge of the outside door handle housing member 52. In this position, the outside door handle assembly 50 can be installed into place in the opening 42 in the outer skin of the structural framework of the vehicle door 40 (shown in FIG. 1).

The irregular central portion 112 is configured such than when the lock plate 100 is moved downward from the position illustrated in FIG. 4 to the position illustrated in FIGS. 5 and 6 (the installed position), the flanges 114 and 116 will move into close contact with the top and bottom edges of the outside door handle housing member 52. Once in this position, a finger 120 extending from the planar portion 110 near its point of attachment to the irregular central portion 112 will prevent the lock plate 100 from returning to its former position, thereby gripping the steel surrounding the opening 42 in the outer skin of the structural framework of the vehicle door 40 (shown in FIG. 1) tightly.

The lock plate 100 in the illustrated exemplary embodiment is moved from its installation position to its installed position by the clockwise rotation of the cam member 86 when viewed along the axis of the pin 90 from the perspective of the handle mounting arm 78. This movement of the cam member 86 occurs when the outside door handle 58 is actuated (pulled outwardly from the concave portion 56 in the outside door handle housing member 52). The projection 72 on the support arm 62 of the outside door handle 58 bears against a pin 122 extending from the side of the cam member 86 facing the handle mounting arm 80, causing the cam member 86 to rotate against the planar portion 108 of the lock plate 100, pushing it downward from the installation position to the installed position.

A T-shaped linkage member 124 is mounted onto the support arm 60 which extends from the outside door handle 58. The T-shaped linkage member 124 has apertures 126 and 128 extending through opposite ends of the top of the T. The end of the pin 90 preferably extends beyond the aperture 64 in the support arm 60 and into the aperture 126 in the T-shaped linkage member 124.

A bolt 130 extends through the aperture 70 in the support arm 60 and the aperture 128 in the T-shaped linkage member 124, and is secured in place by a nut 132. The base of the T is curved, as best seen in FIG. 4. Extending from the side of the T-shaped linkage member 124 at the bottom of the T is a mounting post 134 which has a threaded distal tip.

A linkage support arm 136 extends from the back of the outside door handle housing member 52 well below the position of the handle mounting arm 78. Extending from the side of linkage support arm 136 near the distal end thereof is a mounting post 138 which has a threaded distal tip.

Mounted on the mounting post 138 is an intermediate linkage member 140 which is shaped like a hockey stick. Mounted on the side of the lower end of the intermediate linkage member 140 at the distal tip thereof is a ball 142 which will interface with an outside door lock and door handle interface member (not illustrated in FIGS. 3 through 6). Located in the side of the intermediate linkage member 140 from the top to a position about two-thirds of the way down the "handle" is a slot 144. Also located on the side of the lower end of the intermediate linkage member 140 proximally from the ball 142 is an aperture 146.

The intermediate linkage member 140 is mounted onto the linkage support arm 136 with the mounting post 138 extending through the aperture 146 in the intermediate linkage member 140. The mounting post 134 of the T-shaped linkage member 124 extends through the slot 144 in the intermediate linkage member 140. A nut 148 is screwed onto the threaded distal tip of the mounting post 138 to retain the intermediate linkage member 140 in place on the mounting post 138. A nut 150 is screwed onto the threaded distal tip of the mounting post 134 to retain the mounting post 134 in the slot 144 of the intermediate linkage member 140.

Referring now particularly to FIGS. 4 and 5 of the exemplary illustrated embodiment, it will be appreciated by those skilled in the art that the ball 142 on the intermediate linkage member 140 moves vertically (and to a lesser extent horizontally) as the outside door handle 58 goes from a fully retracted position in FIG. 4 to a fully actuated position in FIG. 5. This movement of the ball 142 can be used to operate a handle cable actuator in the outside door lock and door handle interface member (not illustrated in FIGS. 3 through 6).

Finally, FIGS. 4 through 6 also show a mounting gasket 152 which is placed on the inside of the outside door handle housing member 52 around the perimeter thereof. The mounting gasket 152 can be located intermediate the inside of the outside door handle housing member 52 and the steel of the outer skin of the structural framework of the vehicle door 40 (shown in FIG. 1) when the outside door handle assembly 50 is installed on the structural framework of the vehicle door 40. In the illustrated embodiment, the outside door handle housing member 52 and the outside door handle 58 can both be made of molded plastic material.

By way of example only, the outside door handle 58 can be a paddle type or a pull strap type door handle used in conjunction with the lock and latch system of the present invention. In addition, either of these types of door handles could alternately be mounted and pivot with respect either to an outside door handle housing member which is a part of the second component, to the sheet metal outer skin or other structural framework of a vehicle door, or to an outside door lock and door handle interface member. Such changes and substitutions will certainly be readily apparent to one skilled in the art once the principles of the present invention have been made known to that person.

Referring next to FIGS. 7 through 10, an outside door lock 160 is illustrated. This user-manipulatable control 160 is a cylinder-type lock having a proximal end (best shown in FIG. 9) into which a key (not shown herein) can be inserted. If the correct key is inserted into the outside door lock 160 and is turned, a cylindrical projection 162 located at the distal end of the outside door lock 160 will turn. Located on one side of the cylindrical projection 162 (best shown in FIG. 10) is a pin 164 which extends from the distal end of the cylindrical projection 162 and rotates with the cylindrical projection 162 when the correct key is inserted into the outside door lock 160 and is turned.

Located on one side of the outside door lock 160 in the exemplary embodiment of FIGS. 7–10 is a small projection 166, while located on the other side of the outside door lock 160 is a larger projection 168. The larger projection 168 can be wider than is the small projection 166, as best shown in FIGS. 9 and 10. This ensures the proper orientation of the outside door lock 160 when it is inserted into an outside door lock and door handle interface member (not illustrated in FIGS. 7 through 10). Extending from one side of the larger projection 168 is a spring-loaded tapered projection 170 which will be used to retain the outside door lock 160 in the outside door lock and door handle interface member when it is so installed.

Referring now to FIGS. 11 through 15, an exemplary outside door lock and door handle interface member 172 (and, in FIGS. 13 and 14, two components thereof) according to the present invention is illustrated. The outside door lock and door handle interface member 172 can serve any one or more of three functions: to provide a mounting location for the outside door lock 160 (shown in FIGS. 7 through 10); to provide a coupling mechanism for interfacing rotary motion of the cylinder lock in the outside door lock 160 to linear motion in an outside door lock cable 174; and to provide a coupling mechanism for interfacing movement of the ball 142 of the intermediate linkage member 140 (best illustrated in FIGS. 4 and 5, which occurs when the outside door handle 58 is actuated) to linear motion in an outside door release cable 176.

The outside door lock and door handle interface member 172 includes a housing member 178 which is hollow at one end to receive the outside door lock 160 (an example of which is illustrated in FIGS. 7 through 10) therein. The end of the housing member 178 which has the opening therein can have an enlarged head portion 180 having a contoured recess 182 located in a portion of the sides thereof. This contoured recess 182 is configured to precisely fit the opening 42 in the outer skin of the structural framework of the vehicle door 40 (shown in FIGS. 1 and 16), with the portions of the enlarged head portion 180 surrounding the recess on both sides thereof acting to retain the outside door lock and door handle interface member 172 in place in the opening 42.

Figure 16:
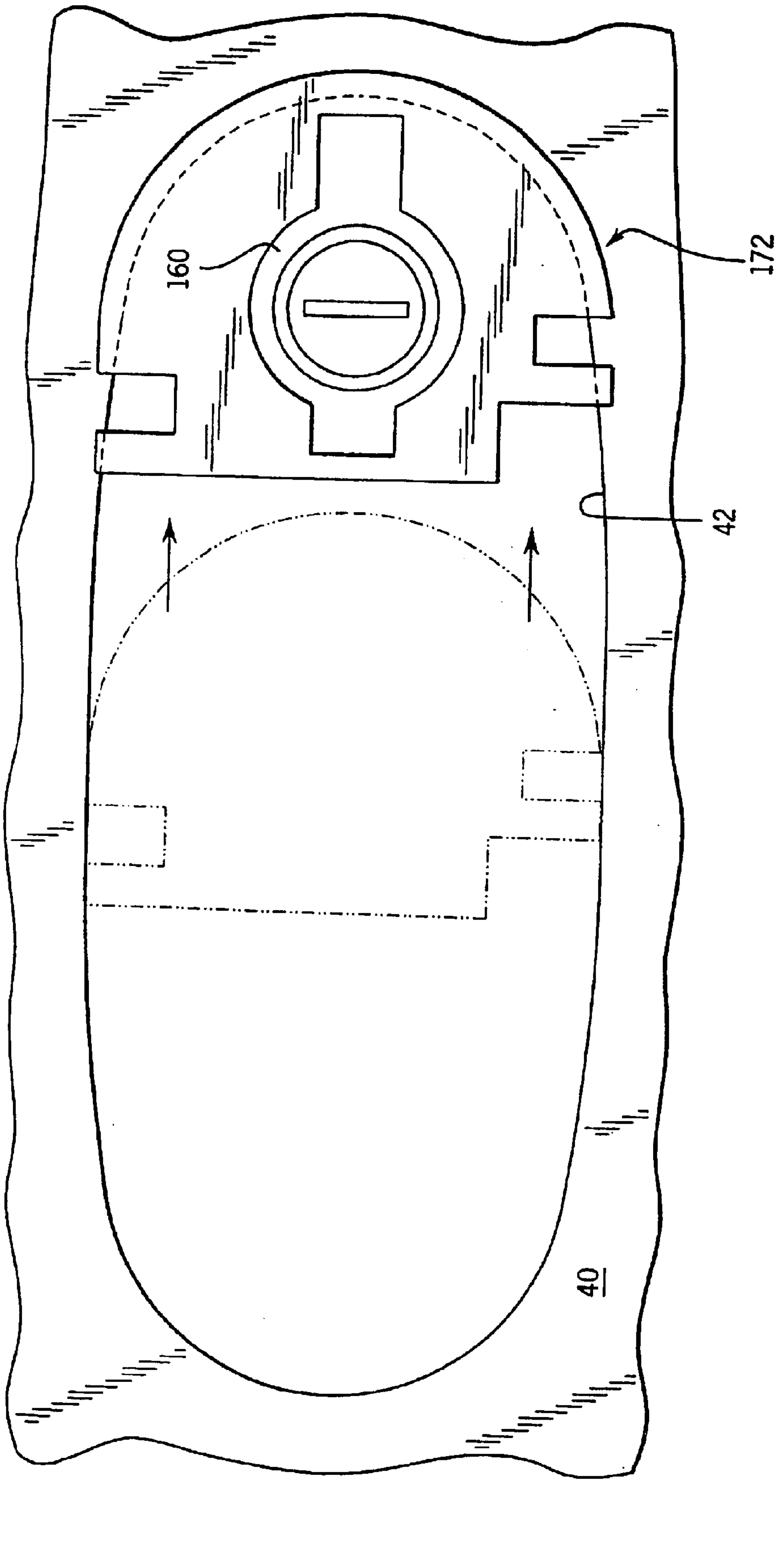
FIG. 16 is a plan view of the portion of the outer skin of the structural framework of the vehicle door 40 (shown in FIG. 1) having the opening 42 therein, showing the installation and placement of the outside door lock and door handle interface member (shown in FIGS. 11, 12, and 15)

Referring for the moment to FIG. 16, the outside door lock and door handle interface member 172 can be installed into the opening 42 in the outer skin of the structural framework of the vehicle door 40 (illustrated in FIG. 1) by placing it into the center of the opening 42 (which can be wider than at the ends of the opening 42) where it is shown in phantom lines, and sliding it (in the direction of the arrows) into place at an end of the opening 42. In this position, the sheet metal at the right side of the opening 42 in the outer skin of the structural framework of the vehicle door 40 will be engaged within the contoured recess 182 of the outside door lock and door handle interface member 172. The outside door handle assembly 50 (illustrated in FIGS. 3 through 6) can then be installed into the opening 42, where it will engage the outside door lock and door handle interface member 172 and retain it in place.

Referring again to FIGS. 11 through 15, the opening in the outside door lock and door handle interface member 172 has a cylindrical opening portion 184 which is centrally located therein, with a narrower rectangular opening portion 186 on one side thereof and a wider rectangular opening portion 188 on the other side thereof. A retaining bar 190 (as best seen in FIG. 12) is located on one side of the cylindrical opening portion 184 to engage the spring-loaded tapered projection 170 of the outside door lock 160 when it is installed in the outside door lock and door handle interface member 172.

Figure 12:
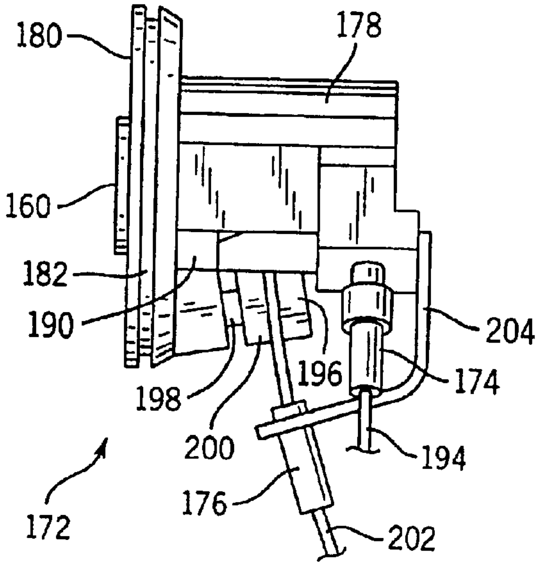
FIG. 12 is a side plan view of the outside door lock and door handle interface member illustrated in FIG. 11, showing a recess located about the periphery of the housing of the interface member which will be used to mount the interface member.

It may be seen in FIG. 12 that the outside door lock 160, when installed in the outside door lock and door handle interface member 172, extends slightly beyond the surface of the enlarged head portion 180. This portion of the outside door lock 160 will fit into the aperture 54 of the outside door handle housing member 52 (illustrated in FIG. 3) when the outside door lock and door handle interface member 172 and the outside door handle housing member 52 are installed into the opening 42 in the outer skin of the structural framework of the vehicle door 40 (as illustrated in FIG. 16). It will be appreciated by those skill in the art that typically the outside door lock 160 is included in a set of identically-keyed locks for installation into the doors, the ignition switch, and the trunk of the vehicle. Accordingly, in some cases the outside door lock 160 will not be installed into the outside door lock and door handle interface member 172 until the lock and latch system is being installed into a motor vehicle.

Figure 13:
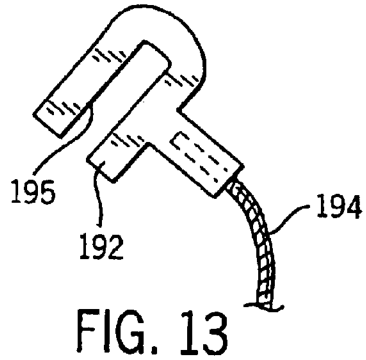
FIG. 13 is a plan view of the cable actuator illustrated in FIG. 11.

Located in the back of the cylindrical opening portion 184 in the exemplary housing member 178 is an outside door lock cable actuator 192 (which is best shown in FIG. 13). The outside door lock cable actuator 192 is U-shaped, with the middle of one side of the U being connected to one end of a cable wire 194. The cable wire 194 is located inside the outside door lock cable 174. The pin 164 on the cylindrical projection 162 of the outside door lock 160 (best illustrated in FIGS. 8 and 10) will fit inside the interior of the U (which is identified by the reference number 195) when the outside door lock 160 is installed into the outside door lock and door handle interface member 172. Thus, it will be appreciated by those skilled in the art that when a key (not illustrated herein) is placed into the outside door lock 160 and rotated, rotating the cylindrical projection 162 and the pin 164, the pin 164 will actuate the outside door lock cable actuator 192 and cause the cable wire 194 to be moved inside the outside door lock cable 174.

Figure 14:
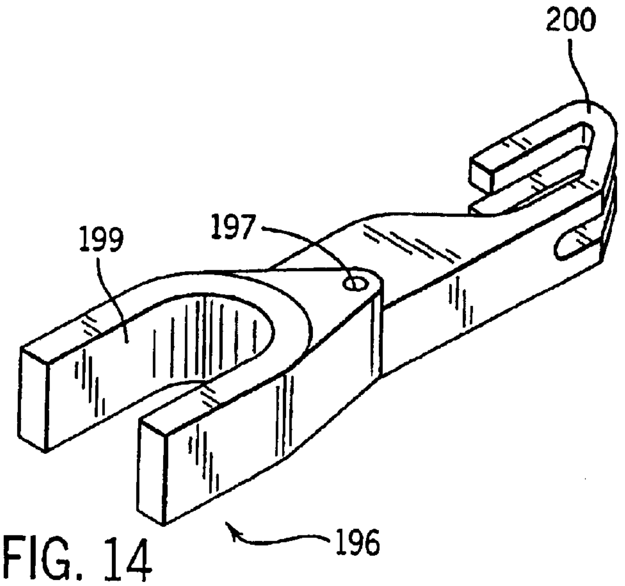
FIG. 14 is a perspective view of the outside door handle cable actuator illustrated in FIG. 11, showing a centrally-located aperture extending therethrough, the curved end for attachment to the cable, and the U-shaped fork which is the other end thereof.
Figure 15:
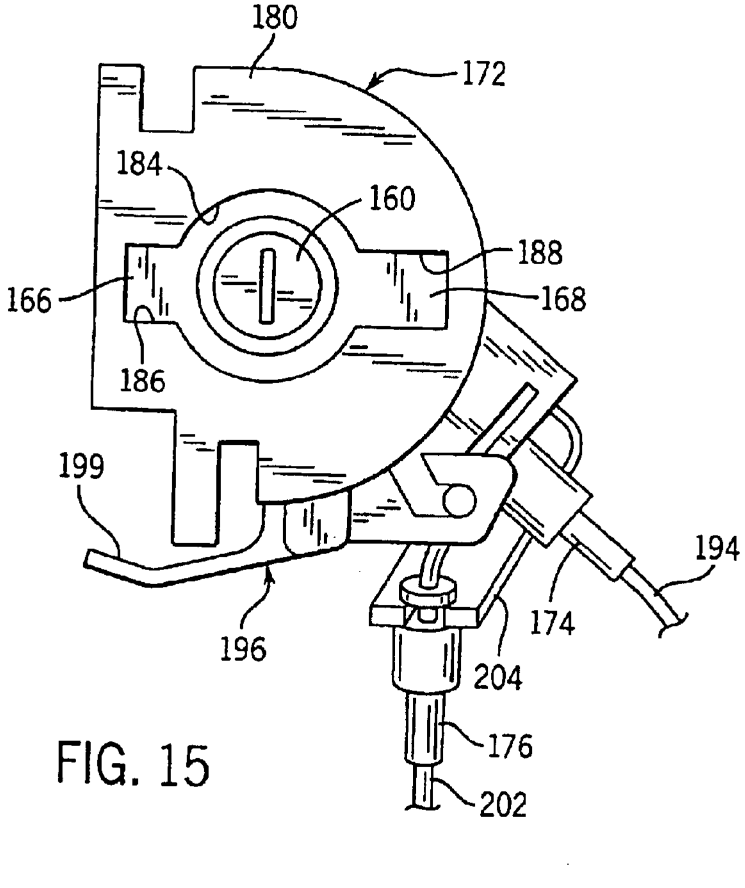
FIG. 15 is a front plan view of the outside door lock and door handle interface member illustrated in FIGS. 11 and 12 from the front side thereof, showing the outside lock assembly illustrated in FIGS. 7 through 10 installed therein.

Also mounted on the exemplary outside door lock and door handle interface member 172 illustrated in FIGS. 11–15 is an outside door handle cable actuator 196 (which is best shown in FIG. 14). The outside door handle cable actuator 196 has an aperture 197 which is centrally located therein, and is pivotally mounted on a pivot pin 198 extending from the side of the housing member 178. One end of the outside door handle cable actuator 196 is U-shaped (as identified by the reference numeral 199), and this U-shaped end 199 will engage the ball 142 on the intermediate linkage member 140 of the outside door handle assembly 50 (illustrated in FIGS. 4 and 5). The other end of the outside door handle cable actuator 196 (which is indicated generally by the reference numeral 200) is connected to one end of a cable wire 202. The cable wire 202 is located inside the outside door lock cable 176. The outside door lock cable 176 is secured to the outside door lock and door handle interface member 172 by a bracket 204.

Thus, it will be appreciated by those skilled in the art that when the outside door handle 58 of the outside door handle assembly 50 (illustrated in FIGS. 4 and 5) is actuated, the ball 142 on the intermediate linkage member 140 will move, causing a corresponding movement of the outside door handle cable actuator 196. As the outside door handle cable actuator 196 moves, the cable wire 202 inside the outside door release cable 176 will move as well.

Referring now to FIGS. 17 and 18, an electronic door latch 210 employed in an exemplary embodiment of the present invention is illustrated. By way of example only, this door latch 210 is the second illustrated electronic door latch embodiment in FIGS. 17–31 of U.S. patent application Ser. No. 09/408,993, which is hereby incorporated by reference insofar as it relates to vehicle door latches, their manner of operation, and the manner in which such latches are connected to latch inputs. The electronic door latch 210 in FIGS. 17 and 18 uses two cables which are respectively operatively connected to a solenoid (not shown) within the latch 210 such that movements of the cables can also be used to extend or retract a pin (e.g., an armature of the solenoid) from one or two control elements (e.g., levers located within the latch 210 and movable to trigger release of the striker 220). Rather than repeat the extensive technical description of the electronic door latch described in U.S. patent application Ser. No. 09/408,993, only the application of this latch will be described herein.

FIGS. 17 and 18 illustrate the exemplary electronic door latch 210, which has a front cover 212, a rear mounting plate 214, and a housing 216, together enclosing the internal elements and mechanisms of the electronic door latch 210. The rear mounting plate 214 has a plurality of threaded apertures 218 which can be utilized to secure the electronic door latch 210 to the structural framework of the vehicle door 40 (in the position illustrated in FIG. 2).

The electronic door latch 210 operates to secure the vehicle door 40 by releasably engaging and retaining a striker 220 mounted on a vehicle body (not illustrated herein). The electronic door latch 210 utilizes a ratchet 222 (also known as a fork bolt) which is rotatably mounted within the housing 216. The exemplary electronic door latch 210, like the electronic door latch described in U.S. patent application Ser. No. 09/408,993, has two control elements located therein.

In the illustrated embodiment, two of the cables attached to the electronic door latch 210 are actuated by the outside door handle 58 (illustrated in FIG. 5) and the inside door handle (which has not yet been described herein), respectively. The outside door release cable 176 is secured to the housing 216, and has a cable wire 202 contained therein. The end of the cable wire 202 is attached to a control element, which is entirely contained within the housing 216. An inside door release cable 222 is secured to the housing 216, and has a cable wire 224 contained therein. The end of the cable wire 224 is connected to another control element, which is also entirely contained within the housing 216.

The outside door lock cable 174 is connected to the front cover 212, and contains the cable wire 194. An inside door lock cable 226 is also connected to the front cover 212, and contains a cable wire 228. In the exemplary embodiment illustrated herein, the outside door lock cable 174 and the inside door lock cable 226 are both used to lock the one of the control elements. When this control element is locked, and the outside door release cable 176 is pulled, the electronic door latch 210 will not unlatch. However, when this same control element is unlocked, and the outside door release cable 176 is pulled, the electronic door latch 210 will unlatch. For more complete understanding of the operation of the illustrated electronic door latch 210, the reader is referred to U.S. patent application Ser. No. 09/408,993. In the illustrated embodiment of the present invention, one control element corresponding to the inside door handle is never locked (although it will be appreciated by those skilled in the art that it could be locked if the inside door lock cable 226 was connected to it instead of the other control element).

Referring next to FIG. 19, an inside door handle and inside door lock assembly 232 according to an exemplary embodiment of the present invention is illustrated for installation in the location 44 on the structural framework of the vehicle door 40 (illustrated in FIG. 2). The inside door handle and inside door lock assembly 232 has a base member 234 having a mounting stub 236 on the bottom edge thereof and a mounting tab 238 having an aperture 240 therethrough on the left side edge thereof. An user-manipulatable control (e.g., an inside door handle 242) is hingedly mounted onto the base member 234, and is biased into the position illustrated in FIG. 19.

Figure 20:
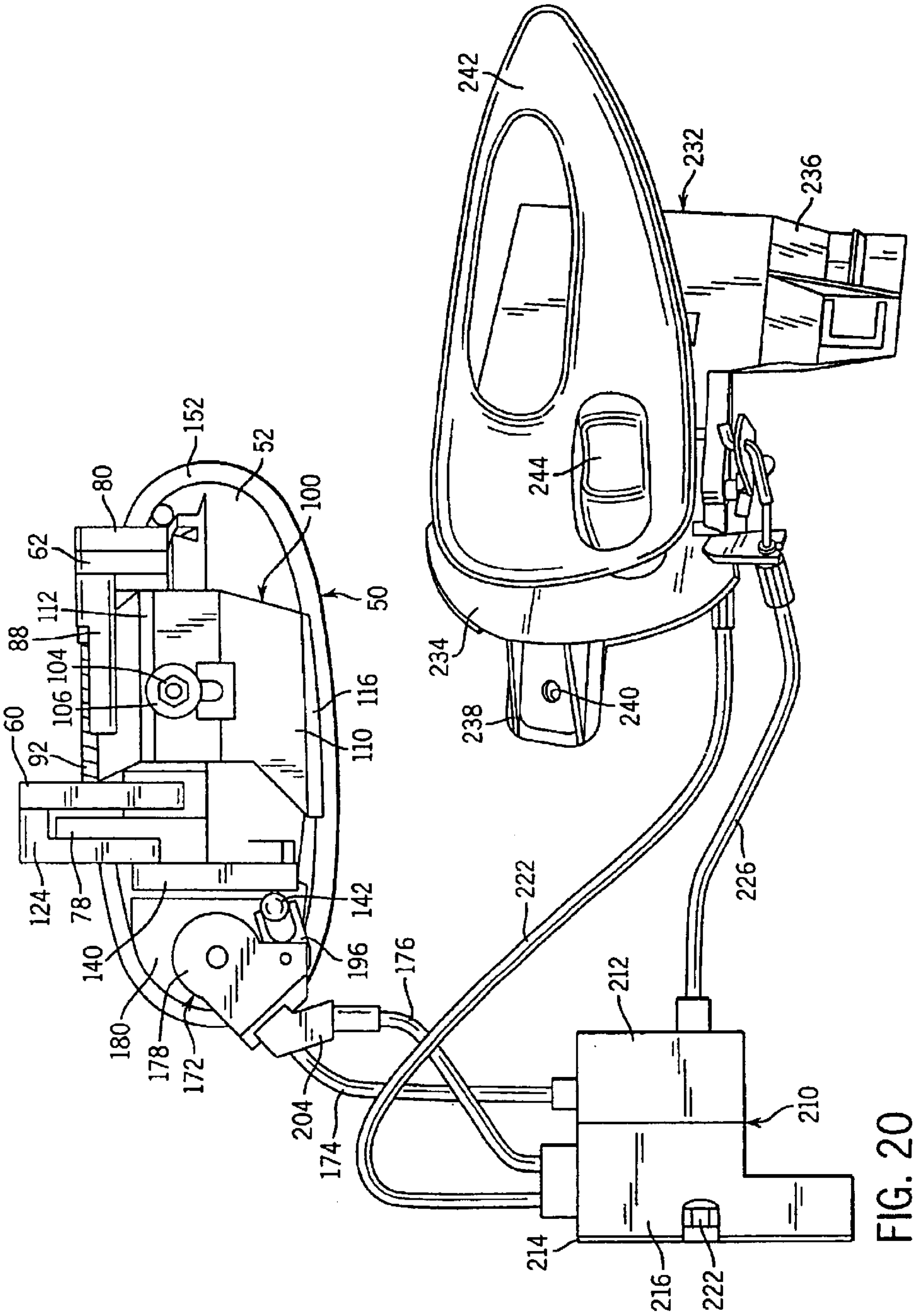
FIG. 20 is a plan view depicting the door latch assembly illustrated in FIGS. 17 and 18 and the outside door lock and door handle interface member illustrated in FIGS. 11, 12, and 15 with two cables interconnecting them, also showing two cables interconnecting the door latch assembly and the inside door handle and inside door lock assembly illustrated in FIG. 19, and also showing the outside door lock and door handle interface member positioned in engagement with the outside handle illustrated in FIGS. 3 through 6.

Actuating the inside door handle 242 illustrated in FIG. 20 is accomplished by pulling its unconnected end outwardly from the base member 234, which pulls the cable wire 224 from the end of the inside door release cable 222 shown in FIG. 19. A user manipulatable control (i.e., an inside door lock actuator 244) is also shown in FIG. 19 to be of the rocker type. Pushing on its right side (as shown in FIG. 19) pulls the cable wire 228 from the end of the inside door lock cable 226 shown in FIG. 19, locking the electronic door latch 210 (shown in FIGS. 17 and 18). Pushing on the left side of the inside door lock actuator 244 pushes the cable wire 228 back into the inside door lock cable 226, unlocking the electronic door latch 210. The mechanisms used to connect the inside door handle 242 to the inside door release cable 222 and the inside door lock actuator 244 to the inside door lock cable 226 are not shown in greater detail since they are of a simple nature which will be readily apparent to one skilled in the art. In addition, one skilled in the art will also appreciate that instead of the inside door handle and inside door lock assembly 232 being used, a separate inside door handle assembly (not illustrated herein) and inside door lock assembly (not illustrated herein) could instead be used.

In some alternative embodiments of the present invention, the inside door handle and inside door lock assembly 232 comprise a fourth component which is not initially connected to the rest of the first component (the electronic door latch 210, the outside door handle assembly 50, and the cables between components 174, 176, 222, and 226). In such embodiments, the first component would, however, include cables 222 and 226 which will be connected to the mechanism of the inside door handle and inside door lock assembly 232. While the rest of the first component is installed in the structural framework of the vehicle door 40, these cables 222 and 226 can be extended out of the vehicle door 40 to allow them to be connected to the inside door handle and inside door lock assembly 232. Thus, in such embodiments, following the connection of the first and fourth components together, the inside door handle and inside door lock assembly 232 can be installed into the structural framework of the vehicle door 40.

Referring now to FIG. 20, the entire lock and latch system of an exemplary embodiment of the present invention is illustrated in an assembled form. Note particularly the four cables between the components. The outside door lock cable 174 and the outside door release cable 176 extend between the outside door lock and door handle interface member 172 and the electronic door latch 210, and the inside door release cable 222 and the inside door lock cable 226 extend between the inside door handle and inside door lock assembly 232 and the electronic door latch 210. In one embodiment, the cables are Bowden cables which transfer the motions of the various handles and lock mechanisms to the door latch.

It will be appreciated by those skilled in the art that other types of linkage or a combination of such other types of linkage elements together with cables could be used instead of an all-cable system. For example, a substitute which can be made for one of the cables is another type of mechanical linkage such as a pin. In such an arrangement, the pin can be used, for example, to connect the outside lock to the door latch instead of using the outside door lock cable 174. It will, however, be appreciated by those skilled in the art that the use of cables can substantially enhance the level of security afforded by the lock and latch system of the present invention since such cables can be less susceptible to jimmying by a thief using a "slim jim."

Figure 21:
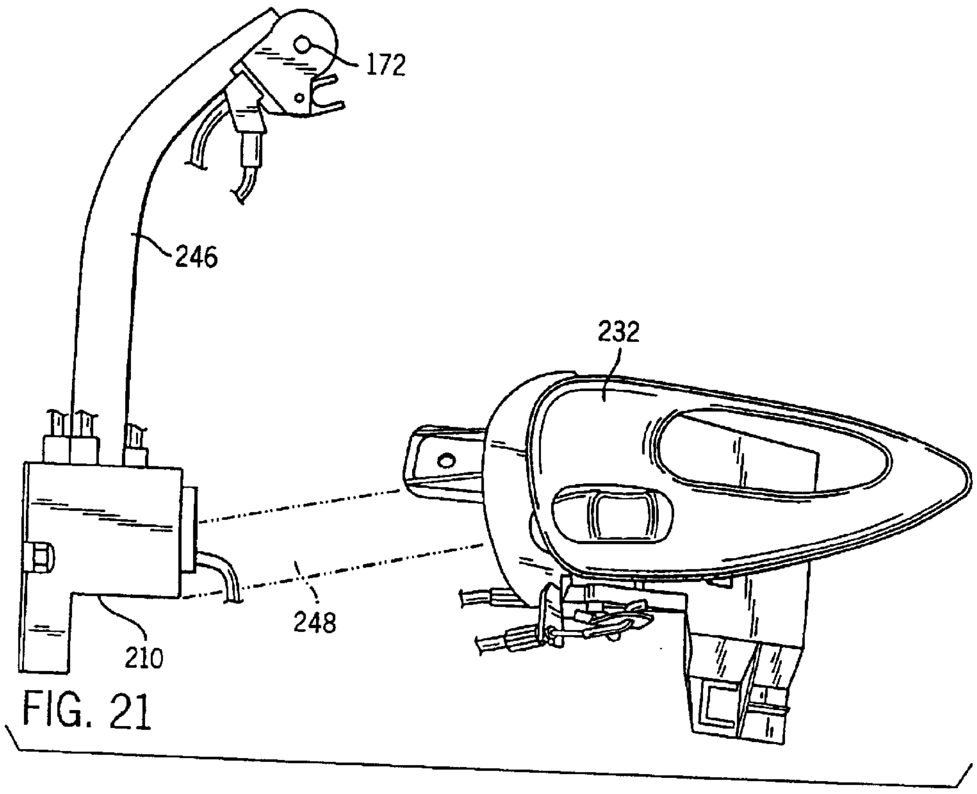
FIG. 21 is a schematic depiction from the side of a mounting bracket used to interconnect the door latch assembly illustrated in FIGS. 17 and 18 with the outside door lock and door handle interface member illustrated in FIGS. 11, 12, and 15, showing in dotted lines an optional extension of the door bracket which can be used to interconnect the door latch and the inside door handle and inside door lock assembly illustrated in FIG. 19, with the cables being omitted for clarity.
Figure 22:
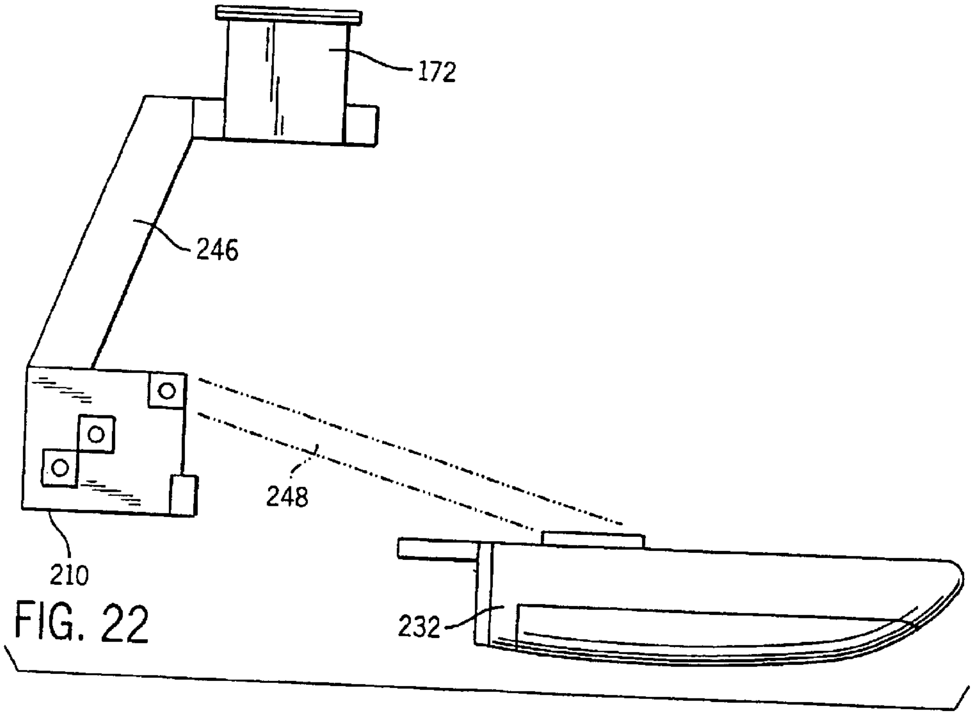
FIG. 22 is a schematic depiction of the mounting bracket similar to that illustrated in FIG. 21, but viewed from the top.

Referring finally to FIGS. 21 and 22, a sheet metal mounting support bracket 246 is schematically illustrated as extending between the outside door lock and door handle interface member 172 and the electronic door latch 210. The mounting support bracket 246 can be used to properly space the outside door lock and door handle interface member 172 and the electronic door latch 210 apart, and in some embodiments will be different for each different vehicle door configuration. Accordingly, the mounting support bracket 246 can have a plurality of bends and curves contained therein which are arranged and configured in accordance with the particular vehicle door configuration, as well as to accommodate the various components to be assembled into the vehicle door.

In a permutation of the mounting support bracket 246, an additional segment of mounting support bracket 248 can extend between the inside door handle and inside door lock assembly 232 and the electronic door latch 210. The mounting support bracket 248 can be used to properly space the inside door handle and inside door lock assembly 232 and the electronic door latch 210 apart, and in some embodiments will again be different for each different vehicle door configuration. In addition, the mounting support bracket 248 can also have a plurality of bends and curves contained therein which are again arranged and configured in accordance with the particular vehicle door configuration, as well as to accommodate the various components to be assembled into the vehicle door.

It will therefore be appreciated from the above detailed description of the embodiments of the present invention that a locking and latching system of modular construction is taught, in which the components of the system can be pre-assembled prior to their installation into the structural framework of a vehicle door. The modular construction of the lock and latch system can include the outside and inside door handles, the outside and inside locks, the door latch itself, as well as linkages between these components. The modular components of the present invention can facilitate the assembly process by, for example, being of a design which simplifies the process of installing them into the structural framework of a vehicle door, without requiring the use of specialized tools, thereby reducing the labor costs associated with assembly. The lock and latch system can substantially enhance the security of the vehicle by providing a lock and latch system which by virtue of its design has an enhanced level of resistance to manipulation by jimmying with a "slim jim" or similar tool of the type commonly used by car thieves.

The lock and latch system can include the outside door handle as a separate modular component, thereby allowing outside door handles to be manufactured in a variety of colors to match exterior vehicle paint colors while allowing the other modular components of the system to be of a single type and color. The pre-assembled nature of the modular components can eliminate the requirement for adjustments to be made during the assembly of the components of the lock and latch system into the structural framework of a vehicle door, thereby further minimizing assembly costs while simultaneously enhancing vehicle quality. The modular components of the lock and latch system in some embodiments of the present invention can be adaptable for uses on a variety of different vehicles by merely switching outside door handles and providing different size linkages between the various modular components.

The lock and latch system of the present invention can be of a construction which is both durable and long lasting, and which requires little or no maintenance to be provided by the user throughout its operating lifetime. The lock and latch system of the present invention can also be of inexpensive construction to enhance its market appeal and to thereby afford it the broadest possible market.

Although exemplary embodiments of the present invention have been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

The foregoing description of the present invention has been presented for purposes of illustration and description only. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

We claim:

1. A door latch system for installation on a door of a vehicle, the door having an aperture in communication between interior and exterior sides of the door, the door latch system comprising:

- a first module for installation on the door from the interior side of the door, the first module including,
  - a latch connectable to the interior side of the door, the latch actuable between a plurality of positions, and
  - a linkage operably connected of the latch and actuable to actuate the latch, the linkage being connectable to the interior side of the door to be accessible from the exterior side of the door through the aperture; and
- a second module for installation on the door from the exterior side of the door, the second module including,
  - a user operable control at least partially insertable into the aperture from the exterior side to couple with the linkage, the user operable control being operable to actuate the linkage to actuate the latch between the plurality of positions.

2. The door latch system of claim 1, wherein the user operable control includes an outside door handle, and wherein the plurality of positions includes an open position and a closed position.

3. The door latch system of claim 2, further comprising a cable connected between the linkage and the latch, wherein the door handle includes a projection, and wherein the linkage includes a cable actuator coupled between the cable and the projection, the door handle being operable to actuate the latch between open and closed positions via the projection, the cable actuator, and the cable.

4. The door latch system of claim 2, wherein the outside door handle is a self-docking type outside door handle.

5. The door latch system of claim 1, further comprising a housing coupled to the linkage and the door, wherein the linkage is coupled to the door through the housing.

6. The door latch system of claim 5, wherein the housing is at least partially positioned within the aperture.

7. The door latch system of claim 6, wherein the housing includes a contoured recess receiving at least a portion of the door defining the aperture.

8. The door latch system of claim 5, wherein the user operable control includes an outside door lock, and wherein the plurality of positions includes a locked position and an unlocked position.

9. The door latch system of claim 8, wherein the outside door lock is operable to selectively actuate the latch by turning key inserted into the outside door lock.

10. The door latch system of claim 8, wherein:

- the housing includes a cylindrical opening; and
- the outside door lock is received within the cylindrical opening of the housing.

11. The door latch system of claim 10, wherein the outside door lock includes a projection that is movable between a retracted position and an extended position, the projection being moved to the extended position after the outside door lock is received within the cylindrical opening of the housing to maintain the outside door lock within the cylindrical opening.

12. The door latch system of claim 10, wherein the outside door lock includes a central axis and a pin rotatable about the central axis, the pin being coupled to the linkage.

13. The door latch system of claim 12, further comprising a cable connected between the linkage and the latch, wherein the linkage includes a cable actuator coupled between the pin and the cable such that the outside door lock is operable to actuate the latch between the locked and unlocked positions via the cable actuator and the cable.

14. The door latch system of claim 1, wherein:

- the first module includes an inside door hand the operatively coupled to the latch and operable to selectively actuate the latch; and
- the plurality of positions includes an open position and a closed position.

15. The door latch system of claim 1, wherein:

- the first module includes an inside door lock operatively coupled to the latch and operative to selectively actuate the latch; and
- the plurality of positions includes a locked position and an unlocked position.

16. The door latch system of claim 1, further comprising a cable connected between the linkage and the latch, the use operable control being operable to selectively actuate the latch between the plurality of positions via the linkage and the cable.

* * * * *